United States Patent [19]

Sato

[11] Patent Number: 5,727,049
[45] Date of Patent: Mar. 10, 1998

[54] IMAGE PROCESSING SYSTEM HAVING AN IMAGE SIGNAL GENERATING DEVICE COUPLEABLE TO AN ADAPTOR

[75] Inventor: Eiichi Sato, Kawasaki, Japan

[73] Assignee: Canon Kabushiki Kaisha, Tokyo, Japan

[21] Appl. No.: 636,630

[22] Filed: Apr. 23, 1996

Related U.S. Application Data

[63] Continuation of Ser. No. 301,034, Sep. 6, 1994, abandoned, which is a continuation of Ser. No. 795,336, Nov. 20, 1991, abandoned.

[30] Foreign Application Priority Data

Nov. 21, 1990 [JP] Japan ................................ 2-318975

[51] Int. Cl.[6] .............................. H04M 11/00; H04N 7/12
[52] U.S. Cl. ........................ 379/96; 379/110; 348/14; 360/35.1
[58] Field of Search ........................ 348/14, 17, 18; 379/96–99, 93, 90, 110, 441; 358/903, 909; 360/1, 10.1, 11.1, 32, 33.1, 35.1

[56] References Cited

U.S. PATENT DOCUMENTS

| | | | |
|---|---|---|---|
| 4,814,876 | 3/1989 | Horio et al. | |
| 4,888,648 | 12/1989 | Takeuchi et al. | 379/96 |
| 4,897,732 | 1/1990 | Kinoshita et al. | 379/96 |
| 4,907,231 | 3/1990 | Watanabe et al. | |
| 4,910,604 | 3/1990 | Takei et al. | 379/93 |
| 4,969,042 | 11/1990 | Houtman et al. | |
| 5,084,775 | 1/1992 | Kodama et al. | 360/35.1 |
| 5,121,261 | 6/1992 | Isogai et al. | 379/93 |

FOREIGN PATENT DOCUMENTS

| | | |
|---|---|---|
| 0348623 | 1/1990 | European Pat. Off. |
| 01277081 | 11/1989 | Japan |
| WO87/03764 | 6/1987 | WIPO ................................ 379/441 |

*Primary Examiner*—Wing F. Chan
*Attorney, Agent, or Firm*—Fitzpatrick, Cella, Harper & Scinto

[57] ABSTRACT

An image processing system wherein an image signal generating device is coupleable to an adapter. The image signal generating device (e.g., a camera) includes an image signal generator for generating an image signal, a power source (e.g., a battery) for supplying electric power to the image signal generator, and an interface for transmitting the image signal to an external unit. The circuit-connecting adapter is detachable from the image signal generating device and includes a second interface for receiving the image signal transmitted from the first interface. The adapter also includes charging circuitry for charging the image signal generating device power source upon attachment of the adapter to the image signal generating device.

37 Claims, 13 Drawing Sheets

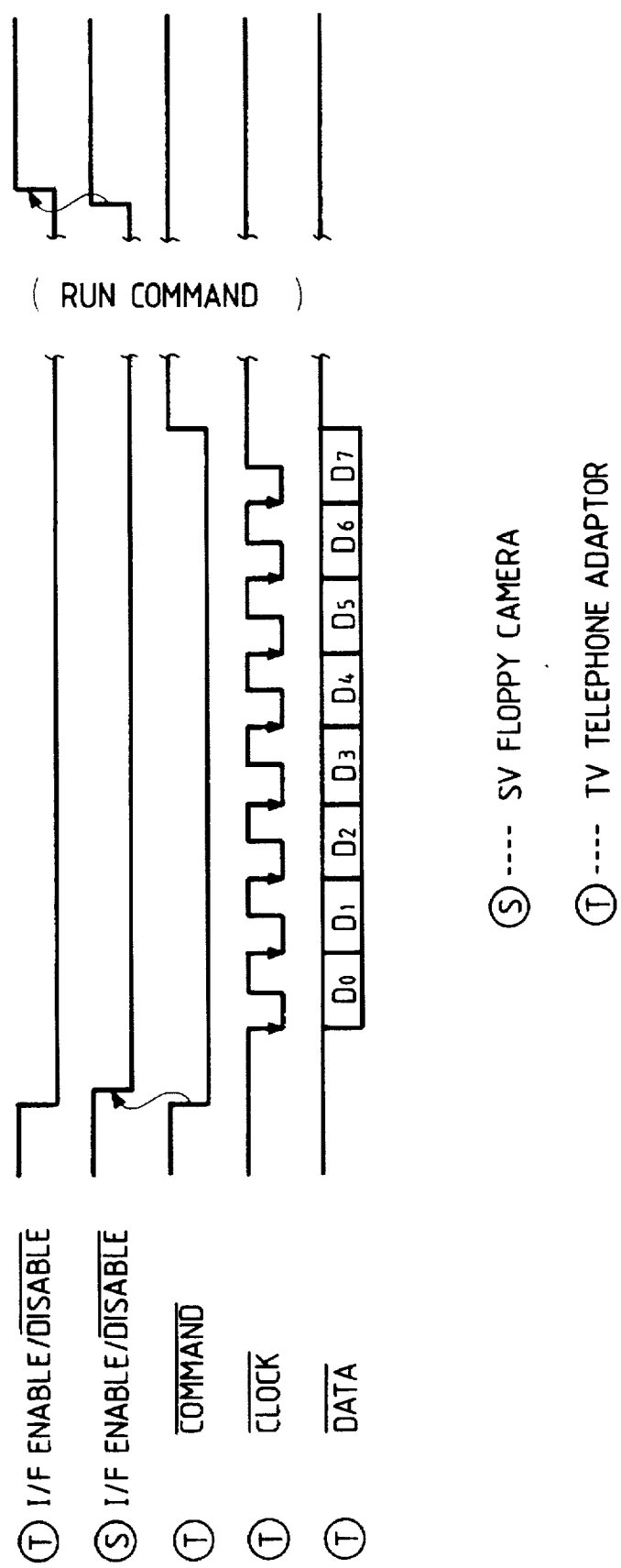

5,727,049

IMAGE PROCESSING SYSTEM HAVING AN IMAGE SIGNAL GENERATING DEVICE COUPLEABLE TO AN ADAPTOR

This application is a continuation of application Ser. No. 08/301,034 filed Sep. 6, 1994, now abandoned, which is a continuation of Ser. No. 07/795,336 filed Nov. 20, 1991, now abandoned.

BACKGROUND OF THE INVENTION

1. Field of the Invention

The present invention relates to an image processing system and an apparatus for forming the image processing system.

2. Description of the Related Background Art

A TV telephone apparatus for use as an example of an image processing system is formed into an integrated structure in such a manner that a camera serving as an image input device is included in the body of the TV telephone apparatus. Furthermore, regarding an image recording means used in the TV telephone apparatus, a method has been known in which a signal, which has been modulated so as to be transmitted, is recorded on a cassette tape after it has been fetched through the audio output. Another method has been known in which a video signal is recorded on to a video tape after it has been fetched through a video output.

However, the above-described conventional structures encounter the following problems:

Since the conventional structure is arranged in such a manner that the camera and the transmission portion are integrally formed and the position of the camera is fixed, there has been a limit present in the compositions which can be photographed, and it is often difficult to photograph a document or a subject. For example, a subject present outdoosr or a subject positioned in another space cannot be photographed.

SUMMARY OF THE INVENTION

An object of the present invention is to provide an image processing system capable of overcoming the above-described conventional problems.

Another object of the present invention is to provide a system capable of causing a camera to face a subject and transmit, if necessary, through a public circuit, an image photographed by the camera.

In order to achieve the above-described objects, according to one aspect of the present invention, there is provided a system comprising a camera which has an image pickup portion, a recording portion, and an interface portion for an adapter, and an adapter which transmits an image to a public circuit and which has an interface portion for the above-described camera.

According to another aspect of the present invention, there is provided a camera which is detachable from an adapter for transmitting an image to a public circuit and which has an image pickup portion, a recording portion and an interface portion for the adapter.

According to another aspect of the present invention, there is provided an adapter for a public circuit which is detachable from a camera which has an image pickup portion, a recording portion and an interface portion for the adapter, the adapter having an interface portion for the above-described camera.

Another object of the present invention is to provide an image processing system capable of electric power supplying to each of the elements when an image signal generating means, such as a camera and a device for receiving an image signal supplied from the above-described means, are constituted as individual members.

Another object of the present invention is to provide an image processing system having a novel structure, a function, or an interface.

Other and further objects, features and advantages of the invention will be appear more fully from the following description.

BRIEF DESCRIPTION OF THE DRAWINGS

FIG. 15 illustrates a command I/O time chart (from a TV telephone adapter to an SV floppy camera) according to this embodiment of the present invention.

DETAILED DESCRIPTION OF THE PREFERRED EMBODIMENTS

Figure 1:
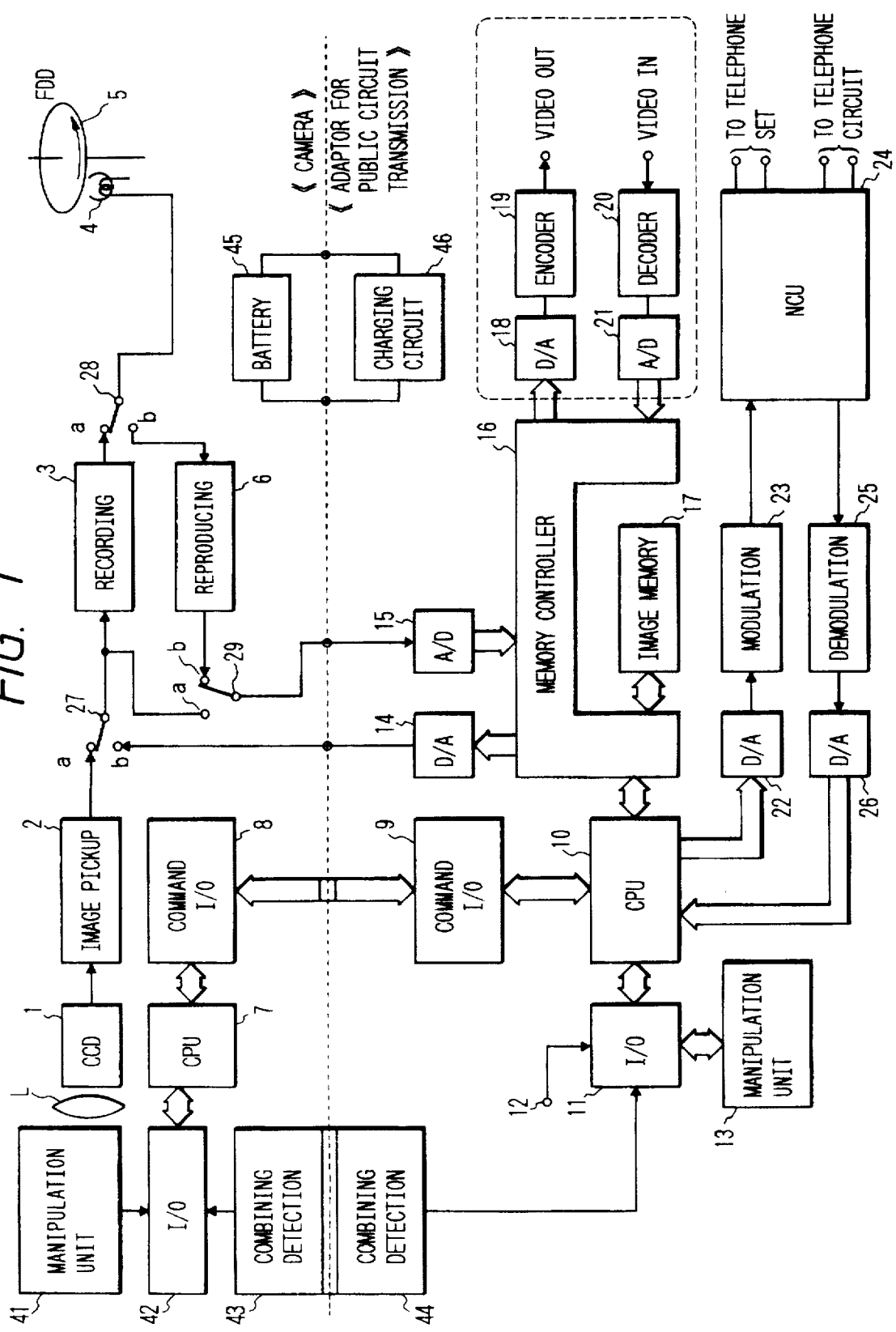
FIG. 1 is a block diagram which illustrates an embodiment of the present invention.

FIG. 1 is a block diagram which illustrates a system according to an embodiment of the present invention. Referring to FIG. 1, a portion above a short dash line illustrates an SV camera, while a portion below the same illustrates a block of a TV telephone adapter.

Referring to FIG. 1, reference numeral 1 represents a CCD which is an image pickup device of a camera and 2 represents an image pickup processing circuit for converting a signal transmitted from the CCD1 into a video signal. Reference numeral 3 represents a record processing circuit for modulating the video signal into a signal to be written to a floppy disk 5. Reference numeral 4 represents a head for recording/reproducing the signal to and from the floppy disk 5. Reference numeral 5 represents the floppy disk serving as a recording medium for an image and 6 represents a reproduction processing circuit for demodulating a reproduction signal transmitted from the floppy disk 5 into the video signal. Reference numeral 7 represents a CPU for controlling the overall control operation of the camera portion. Reference numeral 8 represents a command I/O for establishing a command interface with an adapter for a public circuit transmission (hereinafter called a "TV telephone adapter"). Reference numeral 9 represents a command I/O for establishing a command interface with an SV camera and 10 represents a CPU for controlling the overall control operation of the TV telephone adapter portion. Reference numeral 11 represents an I/O for controlling the manipulation system of the TV telephone and 12 represents a photodetector which is an infrared ray remote control light receiving device. Reference numeral 13 represents a manipulation unit fastened to the TV telephone adapter and 14 represents a D/A converter for D/A converting a signal transmitted from an image memory 17 to transmit it to the SV camera portion. Reference numeral 15 represents an A/D converter for A/D converting the video signal transmitted from the camera portion to record it to the image memory 17. Reference numeral 16 represents a memory controller for establishing an interface between the image memory and an external portion to write/read the signal to and from the memory 17. Reference numeral 18 represents a D/A converter for converting data stored in the image memory 17 into an analog signal of a video rate. Reference numeral 19 represents a video encoder for converting a signal transmitted from the D/A converter 18 into a video signal. Reference numeral 20 represents a video decoder for converting a video signal transmitted from an external portion into a signal to be recorded to the image memory 17. The structure constituted by the above-described elements 18 to 20 may be provided for an adapter portion for public circuit transmission as an alternative to the camera portion. Reference numeral 21 represents an A/D converter for converting a signal transmitted from the video decoder 20 into a digital signal. Reference numeral 22 represents a D/A converter for converting data transmitted from the CPU 10 into an analog signal. Reference numeral 23 represents a modulation circuit for modulating a signal transmitted from the D/A converter 22 into a signal of a transmission format adaptable to the TV telephone. Reference numeral 24 represents an NCU (network Control Unit) for establishing an interface between the telephone circuit and the TV telephone adapter. Reference numeral 25 represents a demodulation circuit for demodulating the received signal into a signal of a base band. Reference numeral 26 represents an A/D converter for digital-converting the demodulating signal so as to transmit it to the CPU 10. Reference numeral 27 represents a switch for selecting a signal supplied from the CCD1 or a signal transmitted from the floppy disk 5 so as to transmit the selected signal to the record processing circuit 3. Reference numeral 28 represents a switch for selecting data recording to the floppy disk 5 or data reading from the same. Reference numeral 29 represents a switch for selecting a signal supplied from the CCD1 or that supplied from the floppy disk 5 so as to transmit the selected signal to the TV telephone portion. Reference numeral 41 represents a camera manipulating unit, 42 represents an I/O device, 43 represents a combining detection circuit for the SV camera and 44 represents a combining detection circuit for the TV telephone adapter. Reference numeral 45 represents a battery for the SV camera, 46 represents a battery charging circuit for supplying electric power to the adapter elements. The battery charging circuit 46 charges the battery 45 after it has converted the electric power supplied from a commercial power source.

Figure 2:
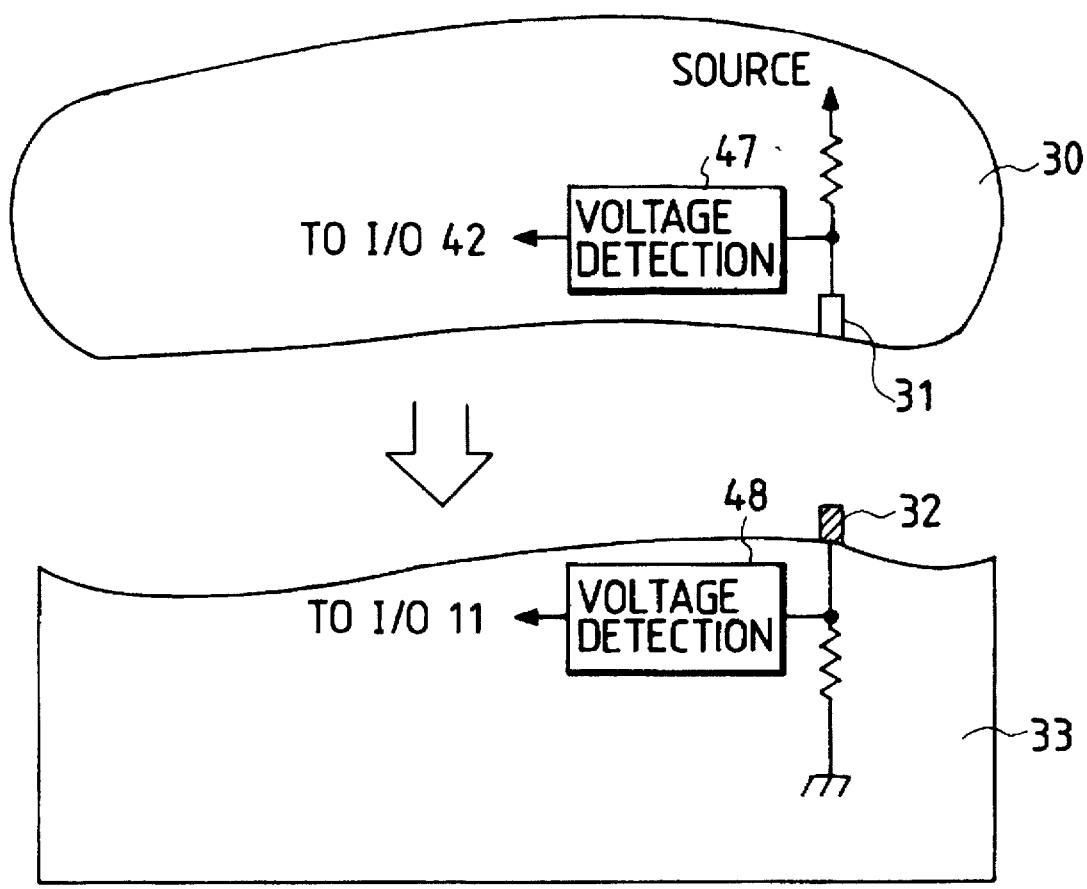
FIG. 2 illustrates the structure of the combining detection means 43 shown in FIG. 1.

FIG. 2 illustrates the combining detection circuits 43 and 44 shown in FIG. 1 in detail. Reference numeral 30 represents the SV camera and 31 represents a combining detection contact for the SV camera 30. Reference numeral 32 represents a combining detection contact for the TV telephone adapter, 33 represents a TV telephone adapter and 47 and 48 represent a combining voltage detection circuit.

Since the structure is constituted as described above, when the SV camera 30 is combined with the TV telephone adapter 33, the combining detection contacts 31 and 32 encounter short circuits, causing combining voltage detection circuits 47 and 48 to fail. The combining voltage detection circuits 47 and 48 convert combining voltage into the digital signals so as to transmit them to the corresponding CPUs as detection signals. When the CPU 7 of the SV camera 30 detects the thus-supplied signal, the SV camera 30 temporarily stops its camera operation but commences an operation to serve as an image input and recording device for the TV telephone. As shown in FIG. 1, the TV telephone adapter 33 is provided with the charging circuit 46 for the SV camera 30 so that charging of the battery 45 of the SV camera 30 is commenced simultaneously with docking. The SV camera and the TV telephone adapter thus combined with each other operate while performing communication by means of their CPUs via the command I/Os 8 and 9.

Figure 8:
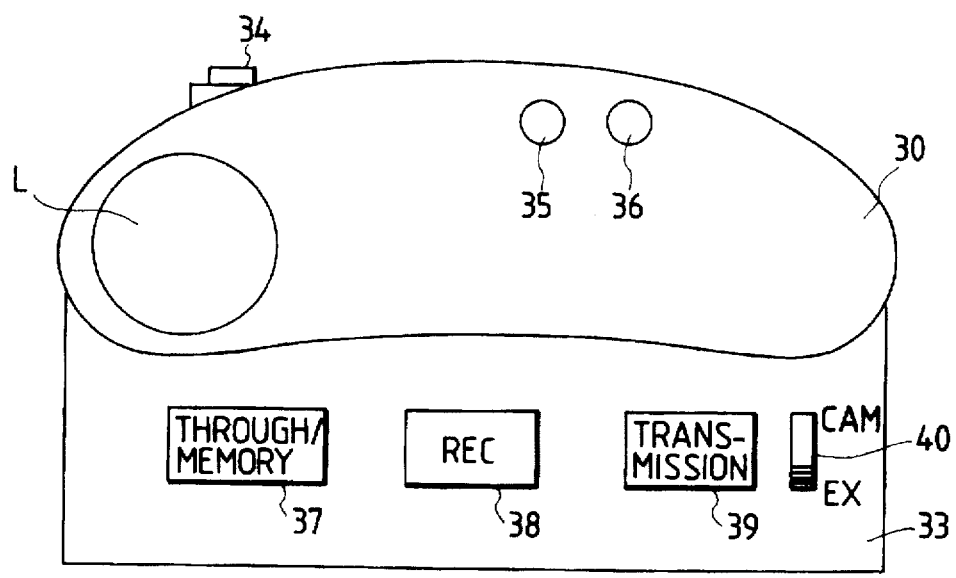
FIG. 8 illustrates the configuration of switches according to this embodiment of the present invention.
Figure 10:
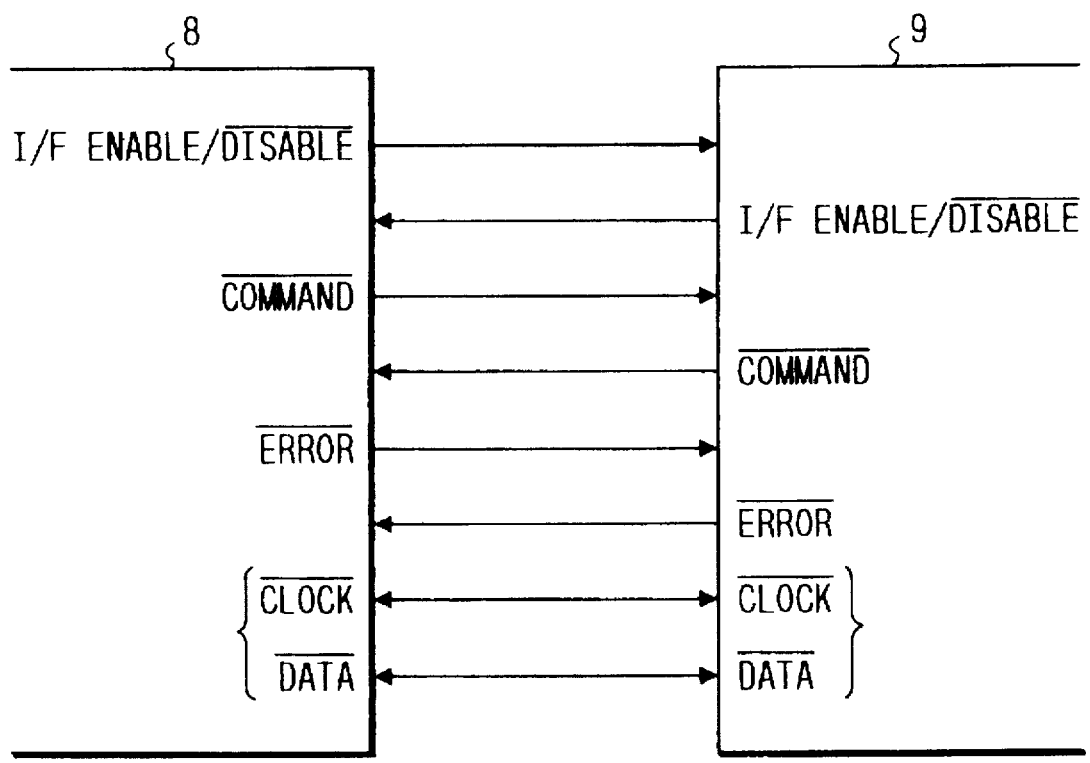
FIG. 10 illustrates the connections established between command I/Os according to this embodiment of the present invention.

FIG. 8 illustrates the configuration of the manipulation switches according to this embodiment. Referring to FIG. 8, reference numeral 30 represents the SV camera, 33 represents the TV telephone adapter and 34 represents a shutter switch for the camera 30, the shutter switch 34 acting as a memory freeze switch when combining has been completed. Reference numerals 35 and 36 respectively represent an ADDRESS-UP switch and an ADDRESS-DOWN switch for the camera 30, the two switches 35 and 36 acting after combining has been completed. Reference numeral 38 represents a Rec trigger switch for recording data to the floppy disk 5, which is a recording medium and which is loaded into the camera. Reference numeral 39 represents a TV telephone transmission switch and 40 represents a switch for selecting an input signal for any of three inputs, that is, the input for the camera system, that for the floppy system (according to this embodiment, it is expressed as "SV" because the SV floppy disk is employed) and that for an external system. When any of the above-described switches is depressed, the corresponding CPU discriminates this fact so as to perform a control operation by means of communication. FIG. 10 illustrates the status of wiring arranged in the command I/Os 8 and 9 which will be described.

Figure 11:
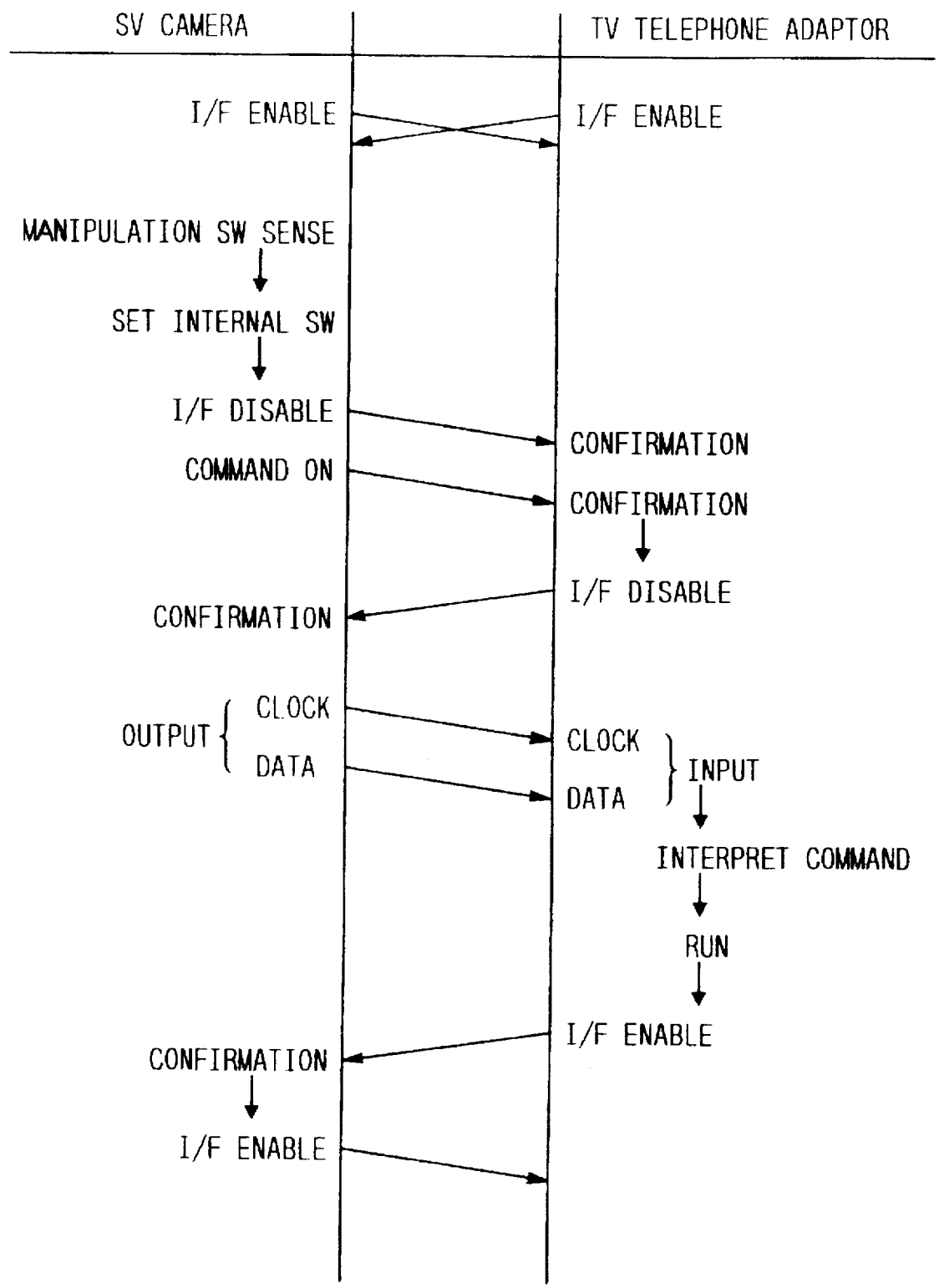
FIG. 11 illustrates a command I/O flow (from an SV floppy camera to a TV telephone adapter) according to this embodiment of the present invention.
Figure 12:
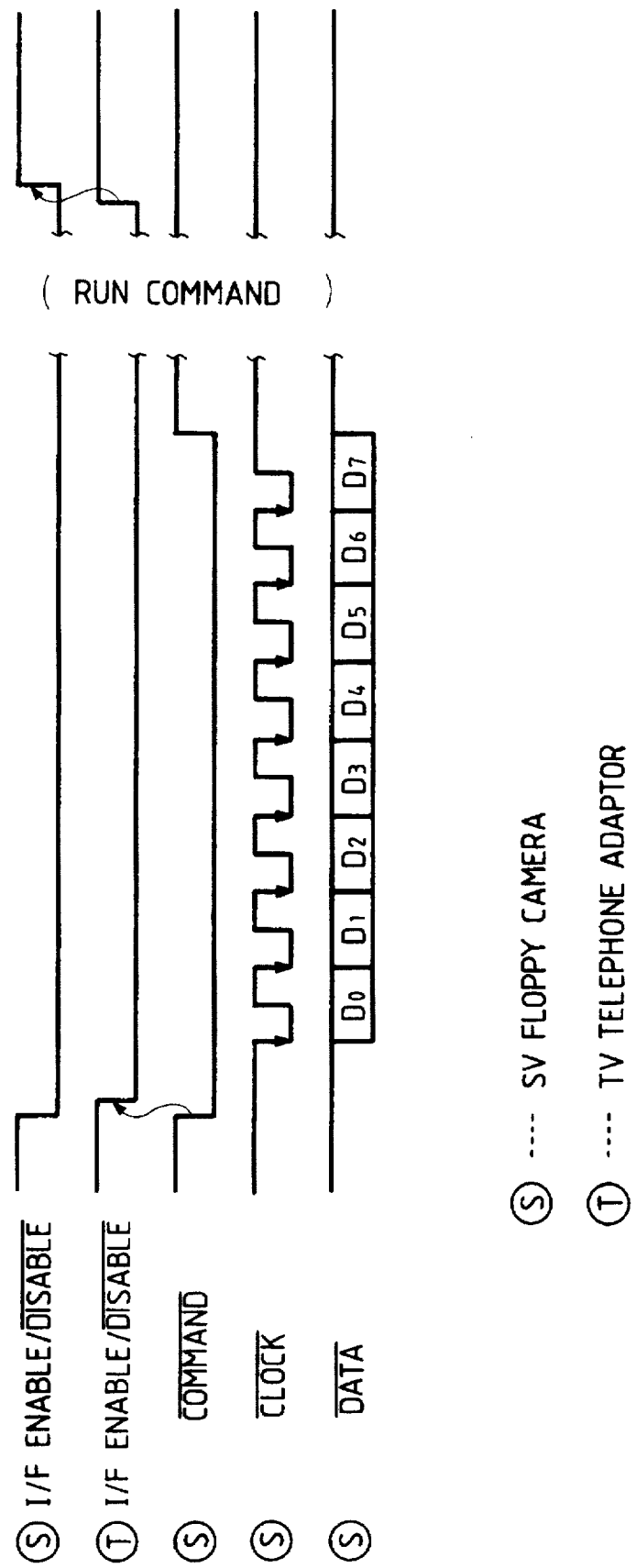
FIG. 12 is a time chart for a command I/O (from an SV floppy camera to a TV telephone adapter) according to this embodiment of the present invention.
Figure 13:
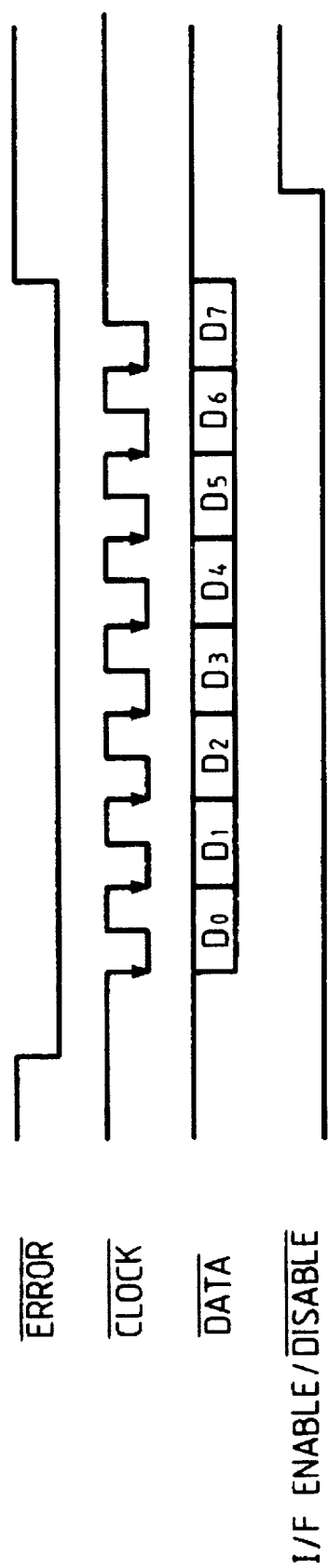
FIG. 13 is a time chart which illustrates a process according to the present invention when an error has taken place.

FIG. 11 is a flow chart which illustrates the contents of the command interface when the switch for the SV camera 30 is depressed. In a state where no switch is depressed, a "I/F Enable/Disable" signal is enabled. When any of the switches for the camera 30 is depressed, the CPU7 for the camera 30 sets any of the internal switches 27, 28 or 29 in accordance with the type of function of the depressed switch. After setting of any of the switches 27, 28 or 29 has been completed, the CPU7 disables the "I/F Enable/Disable" signal at the I/O8 and as well as activating the "Command" signal. When the CPU10 of the TV telephone adapter 33 confirms that the above-described two signals have been activated, it disables the "I/F Enable/Disable" signal at the command I/O9 to make a response. When the CPU7 of the SV camera 30 detects a response signal thus-transmitted, the CPU10 discriminates that the command wait state has been realized and it transmits a Clock signal and a command data signal which is in synchronization with the Clock signal so as to supply command information to the CPU10. If, for example, the freeze switch 34 shown in FIG. 8 is depressed, the SV camera side CPU7 switches over the internal switches 27 to 29 in accordance with setting of the input signal switch 40 before it issues a freeze command to the adapter side CPU10 (in a case where the address UP and DOWN switches 35 and 36 are depressed, the command issue can be eliminated). The CPU10, which has received the above-described signal, reads the command in response to a synchronization signal before it interprets the command to execute it. In a case where no error takes place after the execution, the "I/F Enable/Disable" signal is again enabled before camera side CPU7 is acquainted with the completion of the execution. If an error has taken place, an "Error" signal is, as shown in FIG. 13, activated to transmit/return error information as "Data" which is in synchronization with "Clock" before the "I/F Enable/Disable" signal is again enabled to complete the communication. When the camera side CPU7 for the SV camera 30 detects the "Error" signal, it reads error data before it confirms a fact that the "I/F Enable/Disable" signal has been enabled. Then, it again enables the "I/F Enable/Disable" signal at the command I/O8 to complete the communication. If no error has taken place, the fact that the "I/F Enable/Disable" signal at the command I/O9 has been enabled is confirmed as shown in FIGS. 11 and 12 before it enables the "I/F Enable/Disable" signal at the command I/O8 to complete the communication. The communication protocol is arranged to act as described above when the manipulation switch for the SV camera 30 is depressed.

Figure 14:
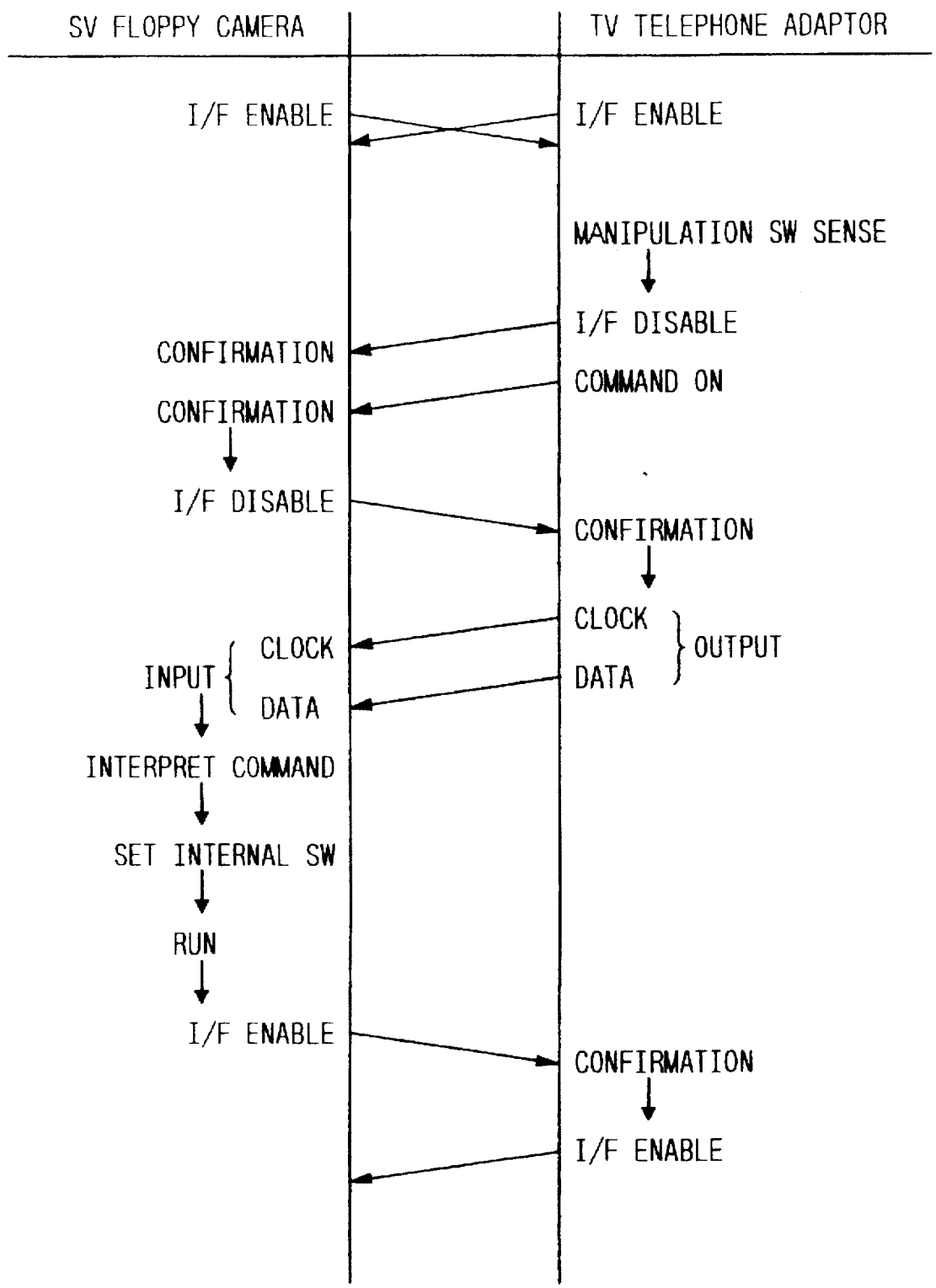
FIG. 14 illustrates a command I/O flow (from a TV telephone adapter to an SV floppy camera) according to this embodiment of the present invention.

Also, in a case where the switch for the TV telephone adapter 33 is depressed, command data is communicated so that the adapter side CPU10 causes the camera side CPU7 to operate correspondingly. Since the difference from the above-described case lies in only a fact that the switch is set after the command has been issued from the TV telephone adapter 33 because the internal switches 27, 28 and 29 are disposed in the portion of the camera 30. All of the other operations are performed in accordance with the same protocol. FIGS. 14 and 15 respectively illustrates a flow chart and a time chart concerning the above-described operation. Since the construction is arranged in such a manner that the SV camera and the TV telephone adapter shown in FIGS. 11 and 12 are replaced with each other, their descriptions are omitted here.

The flow of an image signal and setting of the internal switches in each of the operational mode will now be described.

Figure 3:
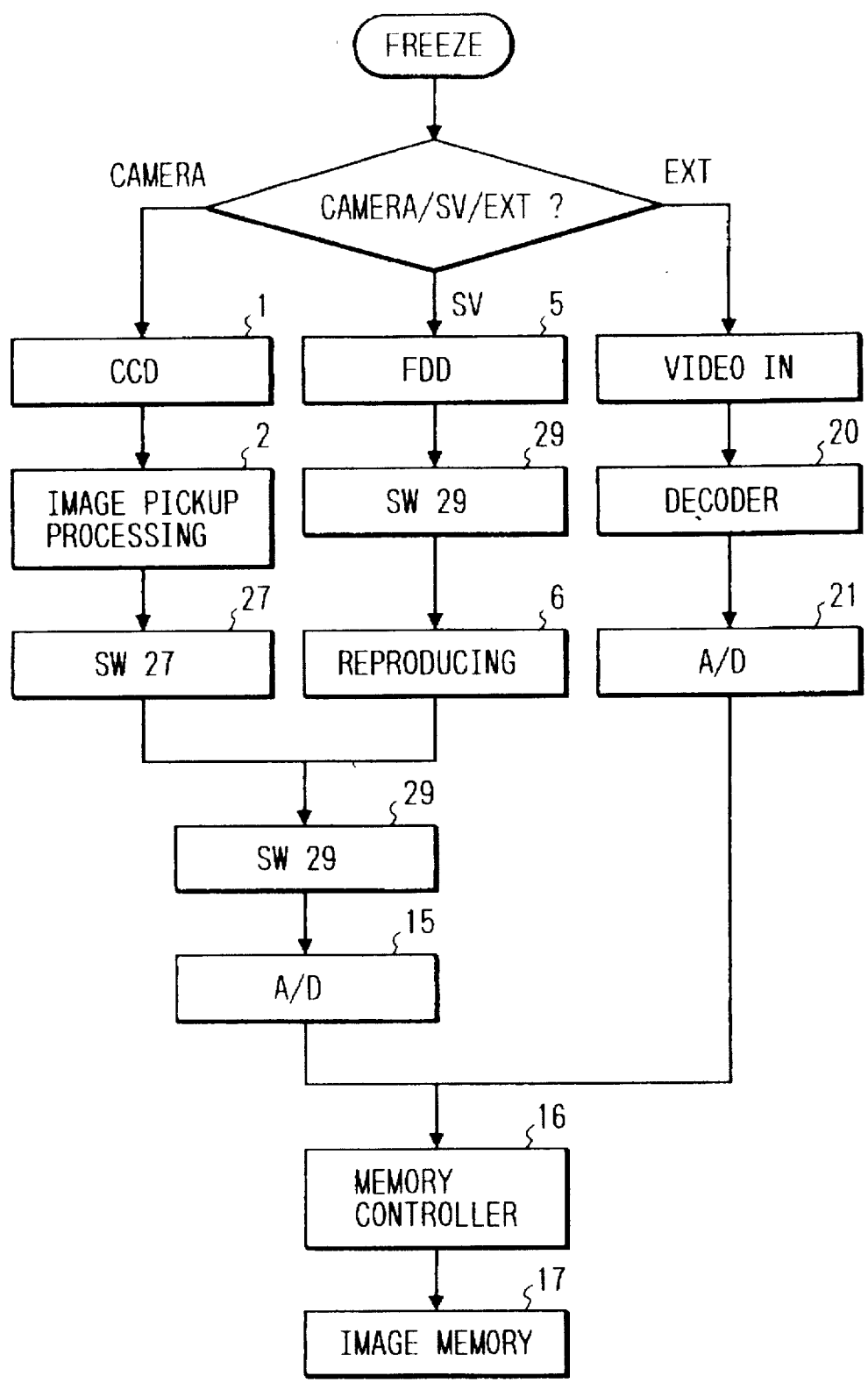
FIG. 3 is a flow chart which illustrates a freezing operation.

FIG. 3 illustrates the flow of the signal when the freeze signal is depressed. In the freeze operational mode, the CPU10 discriminates the input signal to be frozen in accordance with the input signal switch 40. In a case where the camera has been set, an image signal transmitted from the CCD1 passes through the image pickup processing circuit 2 so as to be converted into a color difference signal before it is received by the switch 29 via the switch 27. In a case where the SV is set by the input signal switch 40, a reproduction signal supplied from the floppy disk 5 is reproduced by the head 4. The reproduction signal thus-read passes through the switch 28 before it is, by the reproduction processing circuit 6, converted into a color difference signal which can be frozen in the image memory 17. The converted signal is then supplied to the switch 29. As described above, the image signal from the camera or the SV passes through the switch 29 before it is received by the A/D converter 15 so as to be converted into a digital signal. The digital signal thus-obtained is supplied to the memory controller 16. The memory controller 16 fetches the thus-supplied digital signal into the image memory 17 in accordance with the command issued from the CPU10 so that the freeze operation is completed. In a case where an external input signal is frozen, an image signal supplied through the VIDEO IN is converted into a color difference signal by the decoder 20 before it is converted into a digital signal by the A/D converter 21. The digital signal thus-obtained is then supplied to the memory controller. The memory controller fetches the above-described digital signal into the image memory 17 in accordance with a command issued from the CPU10 so that the image signal is frozen.

Figure 4:
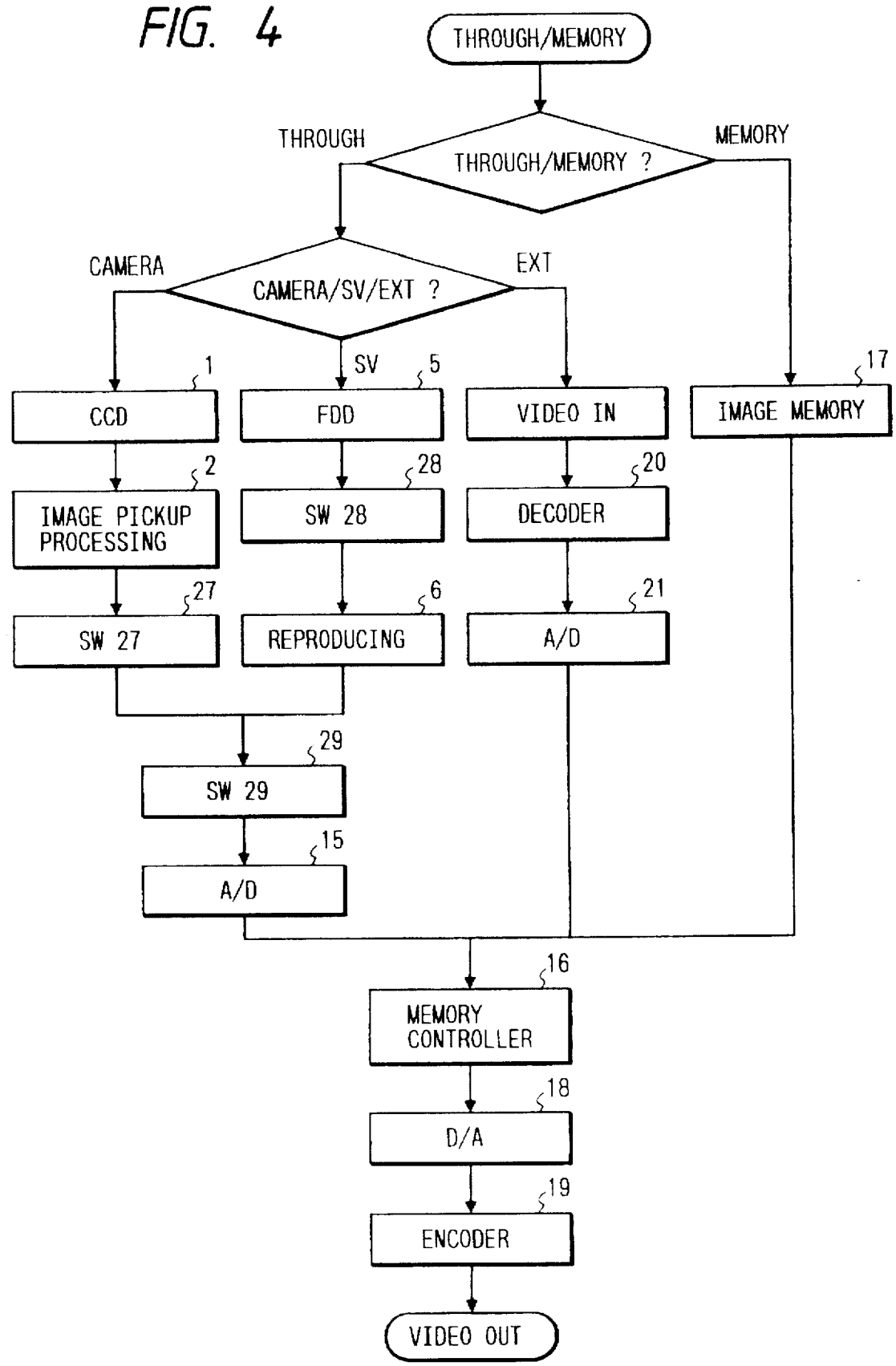
FIG. 4 is a flow chart which illustrates a through/memory displaying operation.

Then, an operation of displaying the throughput image and that of displaying the memory image will now be described. FIG. 4 is a flow chart which illustrates the flow of the signal for use in the above-described operation. When the "through/memory" display switch is depressed, the CPU10 first discriminates that the state is the through display mode or the memory display mode. In a case of the through display mode, the input signal switch 40 is used to discriminate the input signal to be through-displayed. The result of this discrimination is any of the through display of the camera image, the through display of the SV reproduction image or the through display of the external input image. The image signal flows as follows, but where the flow from each device to the memory controller 16 is omitted here because it is the same as that which takes place in the above-described freezing operation: the image signal supplied to the memory controller 16 passes through the memory controller in which it is not subjected to any operation before it is transmitted to the D/A converter 18. The image signal is again converted into the analog signal in the D/A converter 18 before it is converted into a video signal by the encoder 19. The video signal thus-obtained is transmitted through a VIDEO OUT terminal. In a case of the memory display, the data in the image memory 17 is read by the memory controller 16 in synchronization with the video signal before it is converted into an analog signal by the D/A converter 18. The analog signal thus-obtained is transmitted through the VIDEO OUT terminal. Thus, the through image and the memory image are through-displayed.

Figure 5:
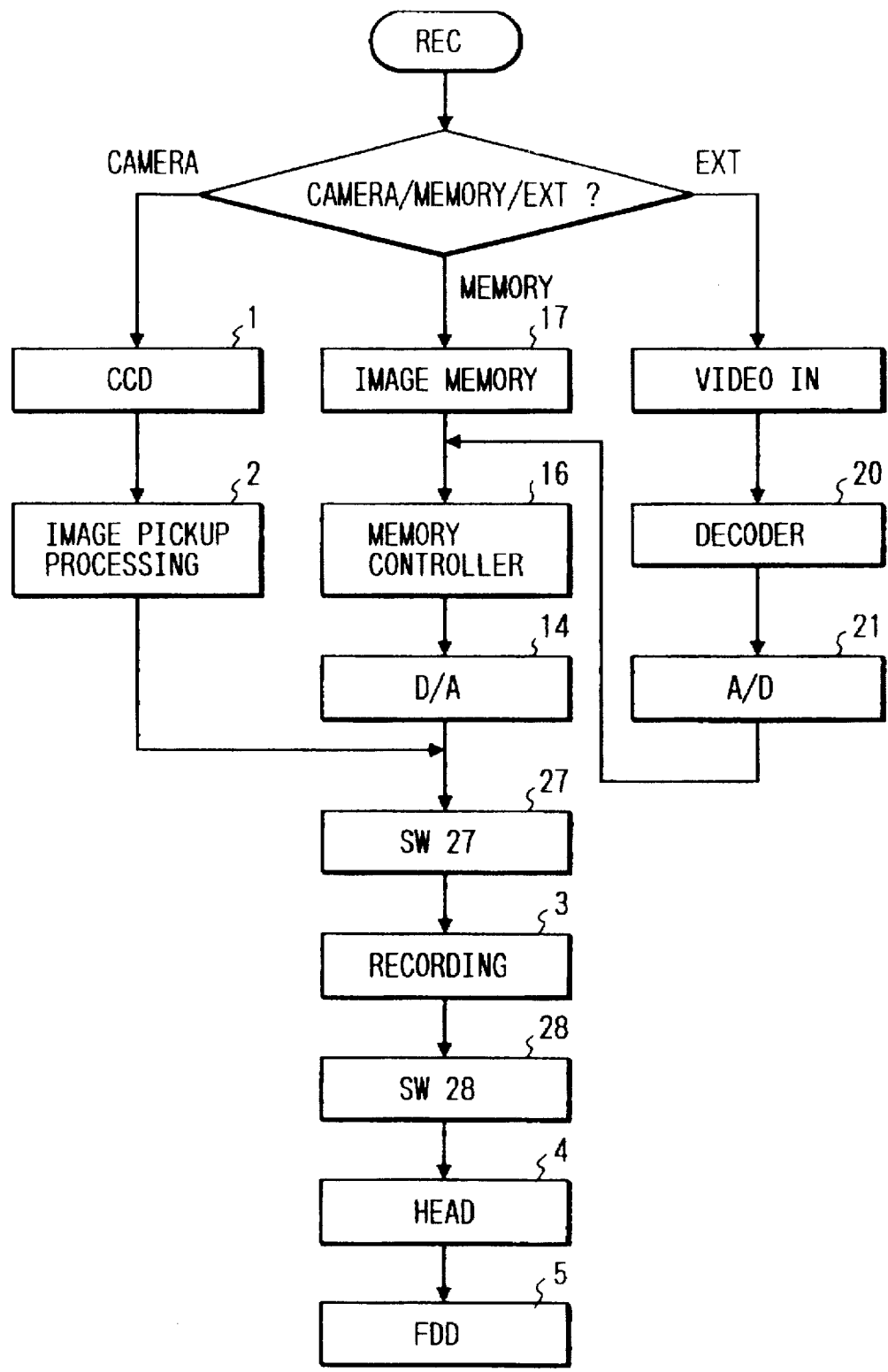
FIG. 5 is a chart which illustrates the flow of a signal at the time of a recording mode.

Then, the flow of the signal at the time of an operation of recording (Rec) data to the floppy disk 5 will now be described with reference to FIG. 5. When the Rec switch 38 is depressed, the CPU10, similar to the above-described freezing operation, discriminates the device which has transmitted the signal to be recorded, the discrimination being made in accordance with the action of the input signal switch 40. In a case where data supplied from the camera is recorded, the signal supplied from the CCD1 is converted into the color difference signal by the image pickup processing circuit 2 before it is supplied to the switch 27. In a case where data supplied from the image memory 17 is recorded, the content of the image memory 17 is read by the memory controller 16 before it is D/A-converted by the D/A converter 14 so as to transmit it to the switch 27. In a case where data of an external input signal is recorded (EXT), a signal supplied through the VIDEO IN terminal is made to be a difference signal by the decoder 20 before it is transmitted to the A/D converter 21. Then, it passes, in the form of the digital signal, through the memory controller 16 before it is again converted into the analog signal by the D/A converter 14. The analog signal is then transmitted to the switch 27. The signal thus-supplied to the switch 27 is converted into a signal to be recorded on the floppy disk 5 by the record processing circuit 3 before it passes through the switch 28. As a result, data is recorded on the floppy disk 5 by the head 4.

Figure 6:
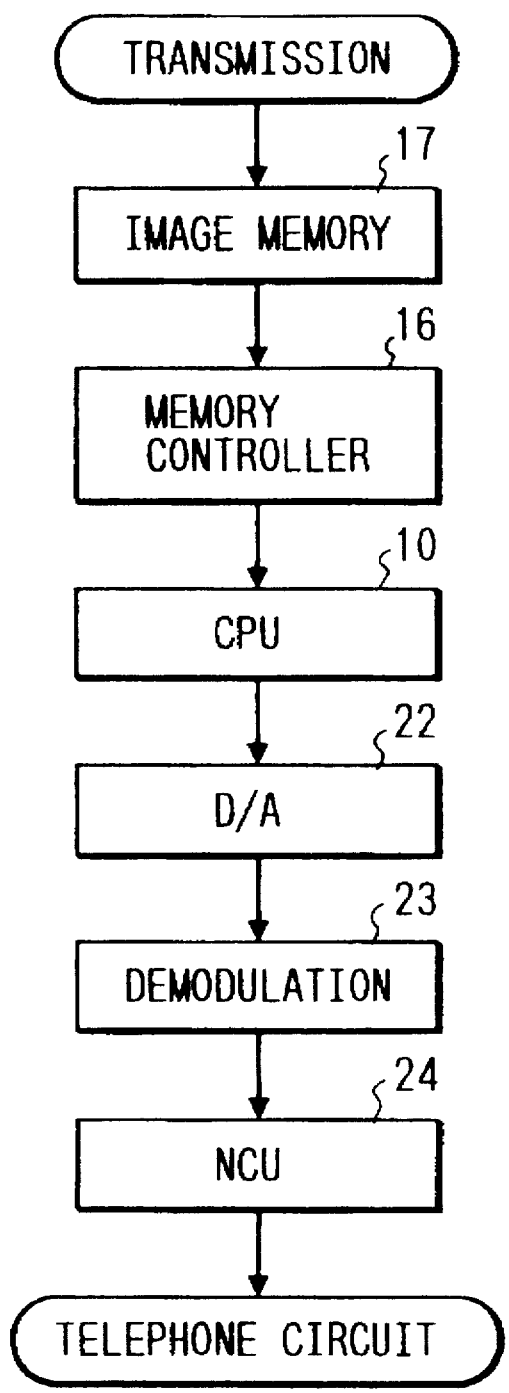
FIG. 6 is a chart which illustrates the flow of a signal at the time of a transmission mode.

The, the flow of the data transmission will now be described with reference to FIG. 6. When the transmission switch 39 disposed in the manipulating portion 13 is depressed, the CPU10 discriminates it so that a transmission sequence is commenced. In the transmission sequence, pixel data at an arbitrary address, which corresponds to the transmission mode, is sequentially read from the image memory 17 by using the memory controller 16. Data thus-read out is transmitted to the D/A converter 22 by the CPU10 before it is converted into an analog signal. Then, it is, by the modulation circuit 23, modulated in synchronization with the carrier and in accordance with the transmission format for the TV telephone before it is transmitted to the NCU24. The NCU24 performs terminative and unbalanced/balanced conversions to transmit the above-described signal to the telephone circuit. The transmission sequence is constructed as described above.

Figure 7:
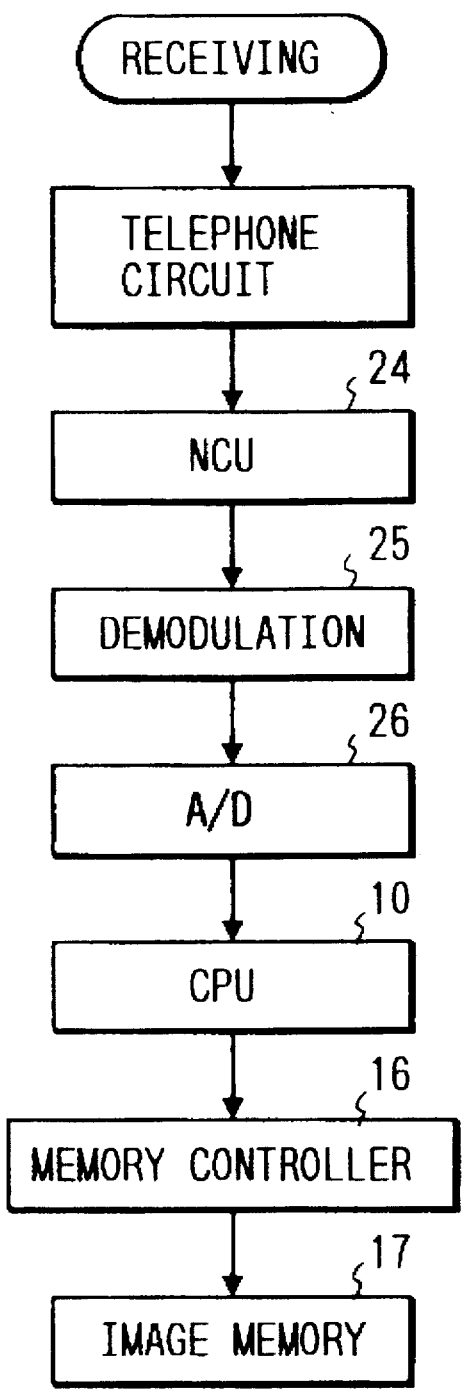
FIG. 7 is a chart which illustrates the flow of a signal at the time of a receiving mode.

The receiving sequence will now be described with reference to a flow chart shown in FIG. 7. The data receiving operation is completely automated while eliminating the provisions of switches. Data supplied to the NCU24 through the telephone circuit is subjected to the terminative and unbalanced/balanced conversions in the NCU24 before it is supplied to the demodulation circuit 25. The signal is then converted into the video rate signal in the demodulation circuit 25 before it is digital-converted by the A/D converter 26 so as to be read by the CPU10. The signal read by the CPU10 is transmitted to the memory controller 16 so that it is written to an address in an arbitrary image memory 17 which corresponds to the transmission mode. The data receiving sequence is constructed as described above.

The basic operation according to this embodiment is arranged as described above. However, the present invention is not limited to this. For example, a modification may be employed in which the signal supplied from the floppy disk 5 is fetched by a means which freezes it to the image memory 17 before the floppy disk 5 is interchanged so as to record it by a means capable of recording the signal in the image memory 17 to another floppy disk 5. In this case, data dubbing and editing can be performed. Another structure may be employed in which the photodetector 12 is provided for enabling all of the switches to be operated in a remote control manner in such a manner that data is read through the I/O11 by the CPU10 to perform the above-described operations.

Other Embodiments

Figure 9:
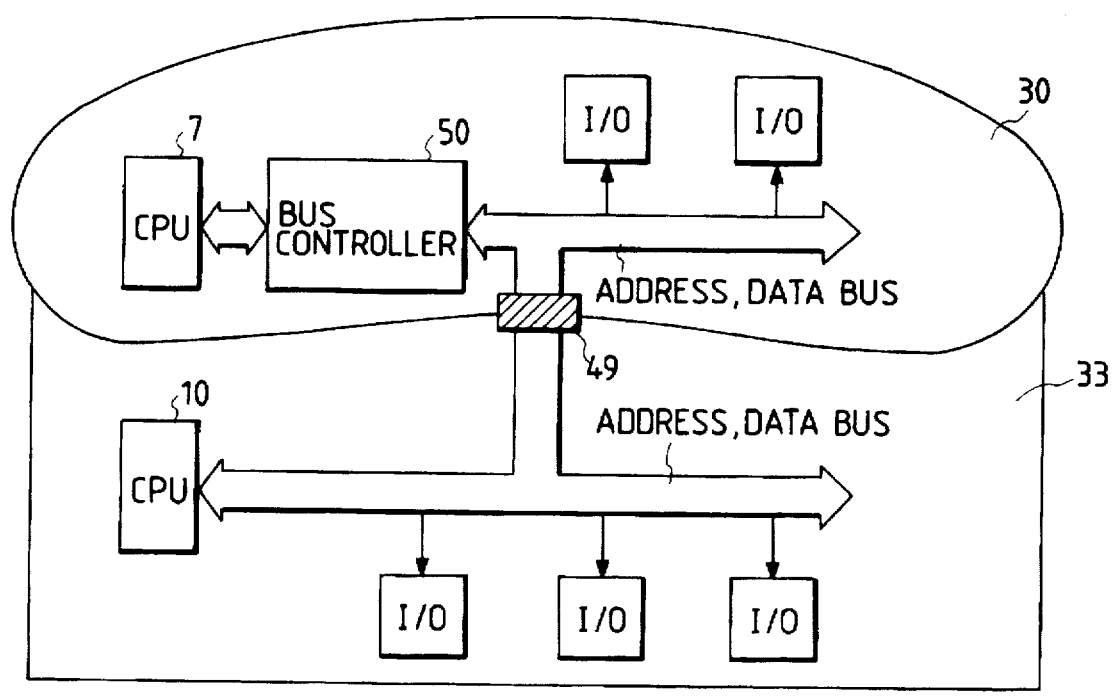
FIG. 9 illustrates an interface means according to another embodiment of the present invention.

Another method of the interface to be established between the SV camera 30 and the TV telephone adapter 33 will now be described with reference to FIG. 9, this method being able to be employed as an alternative to the method of the command interface according to the first embodiment shown in FIGS. 1 to 8. This embodiment is arranged to be different from the above-described method in which hand shaking is performed by means of the command I/O but it is arranged in such a manner that the CPU10 for the TV telephone adapter 33 controls the overall operation. When the SV camera 30 and the TV telephone adapter 33 are combined with each other, the TV camera side CPU7 is perfectly separated from the other I/O devices by a bus controller 50 so that it is brought into an independent state. However, a microcomputer bus (an address bus, a data bus and the like) for the TV telephone adapter 33 is connected by a connector 49 so that each I/O device of the camera 30 is brought into a state under control of the CPU10. As a result, the CPU10 is enabled to perform all of the controls such as scanning of the manipulation switches of the two elements, input the image, and the operation of the floppy disk. As a result, problems which can be take place due to the hand shake operation, such as the time lag, can be overcome. The most significant advantage obtainable from this method lies in that no structure must be provided for software for the camera 30 to act when the TV telephone adapter 33 is connected, and thereby a load required to develop it can be reduced.

As described above, according to this embodiment, the TV telephone adapter is combined with the SV camera to constitute a still image TV telephone apparatus, and as the camera is enabled to act as the image input apparatus and image recording apparatus. As a result, the subject to be photographed can be varied considerably and filing and search of the image can be completed easily. Therefore, a photograph taken at the time of a tour of the user can easily be transmitted to friends, or a photograph of a baby of the user can also easily be transmitted to the parents living far away. Furthermore, if the TV telephone adapter 33 is previously connected to a monitor TV, the necessity of connecting the SV camera 30 to the monitor TV for the purpose of reproducing the image can be eliminated. Therefore, a user who cannot easily establish the wire connection can easily produce the image. Also, charging can be performed simply by placing the SV camera 30 on the TV telephone adapter 33. Therefore, charging can be easily performed while eliminating a necessity of performing a particular charging operation.

Although the recording medium for use in the recording portion comprises the SV floppy disk according to the above-described embodiments, the present invention is not limited to this. Another recording medium, for example, an optical disk or a tape-like medium may be employed. As an alternative to this, a solid memory, for example, a semiconductor memory or a Bloch line memory may be employed.

Although the analog circuit is employed as the telephone circuit according to the above-described embodiments, it may be replaced by a digital circuit such as an ISDN. In this case, the NCU is used for the ISDN circuit.

Although the adapter for transmitting a still image is employed as the TV telephone adapter for use to serve as the public circuit adapter according to the above-described embodiments, an adapter for transmitting movable images may be used in place of the above-described adapter. The necessity lies in that it can be mounted on a detachable camera and it is able to transmit an image signal supplied from the camera or transmit the same reproduced from a record reproducing portion of the camera.

Although the attachment/detachment detection means is structured as shown in FIG. 2, the present invention is not limited to this. Another method, for example, a method for simply detecting the state of the switch, may be employed.

As described above, according to the above-described embodiments, the camera having the image pickup portion and the recording portion is made to be detachable from the image transmission adapter. Therefore, the subject can freely be photographed and the image obtained by photographing can be transmitted through a public circuit.

Although the invention has been described in its preferred form with a certain degree of particularly, it is understood that the present disclosure of the preferred form changed in the details of construction and the combination and arrangement of parts may be modified without departing from the spirit and the scope of the invention as hereinafter claimed.

What is claimed is:

1. An image processing system having a capture terminal and a processing terminal, comprising:
   A) said capture terminal for capturing an image includes:
      an image pick-up circuit for generating an image signal according to a received image;
      a first interface for transmitting to the processing terminal a signal according to the image signal provided from said image pick-up circuit; and
      a capture terminal controller for controlling an operation of said capture terminal;
   B) said processing terminal detachable from said capture terminal includes:
      a controller;
      a second interface receiving the signal transmitted through said first interface; and
      a processing circuit for processing the received signal;
   wherein, responsive to an attachment of said capture terminal to said processing terminal, the controlling of said capture terminal by said capture terminal controller is inhibited and the control of said capture terminal by said controller of said processing terminal begins.

2. A system according to claim 1, wherein said image pick-up circuit includes a CCD.

3. A system according to claim 1, wherein said processing circuit includes a memory circuit for storing the signal.

4. A system according to claim 1, wherein said processing circuit includes a display processing circuit for processing the signal for display.

5. A system according to claim 1, wherein said processing circuit includes a transmitting processing circuit for converting the signal into a transmission signal for transmission to an external apparatus through a public circuit.

6. A system according to claim 1, wherein said capture terminal further includes a detection circuit for detecting establishment of the attachment.

7. A system according to claim 1, wherein said processing terminal further includes a detection circuit for detecting establishment of the attachment.

8. A system according to claim 1, wherein said capture terminal comprises a camera.

9. A system according to claim 1, wherein said processing terminal supplies a power to said capture terminal in response to the attachment.

10. A capture terminal detachable from a processing terminal, said capture terminal comprising:
   an image pick-up circuit for generating an image signal according to a received image;
   an interface for transmitting to the processing terminal a signal according to the image signal provided by said image pick-up circuit; and
   a capture terminal controller for controlling an operation of said capture terminal;
   wherein, responsive to attachment of said processing terminal to said capture terminal, control of said capture terminal by said capture terminal controller is inhibited and control of said capture terminal by a controller provided at said processing terminal begins.

11. A terminal according to claim 10, wherein said processing terminal includes a transmitting processing circuit for converting the signal transmitted from said capture terminal into a transmission signal for transmission to an external apparatus through a public circuit.

12. A terminal according to claim 10, wherein said capture terminal further includes a detection circuit for detecting establishment of the attachment between said capture terminal and said processing terminal.

13. A terminal according to claim 10, wherein said processing terminal includes a detection circuit for detecting establishment of the attachment between said capture terminal and said processing terminal.

14. A terminal according to claim 10, wherein said capture terminal comprises a camera.

15. A terminal according to claim 10, wherein the processing terminal supplies power to said capture terminal in response to the attachment of said capture terminal to said processing terminal.

16. An image signal generating device for use with a circuit-connecting adaptor which is detachable from said image signal generating device, the adaptor including (i) a controller, and (ii) first interface means for receiving an image signal from said image signal generating device, said image signal generating device comprising:
   image signal generating means for generating an image signal;
   second interface means for transmitting the image signal to said first interface means; and
   control means for controlling an operation of said image signal generating device;
   wherein the image signal generating device control means is inhibited from controlling the operation of said image signal generating device in response to an attachment between said image signal generating device and said circuit-connecting adaptor and the circuit-connecting adaptor controller begins controlling an operation of said image signal generating device.

17. An image processing system comprising:
   (A) an image signal generating device including:
      image signal generating means for generating an image signal;
      a power source for supplying electric power to said generating means;
      control means for controlling an operation of said image signal generating device; and
      first interface means for transmitting said image signal to an external unit; and
   (B) a circuit-connecting adapter which is detachable from said image signal generating device, said adapter including:
      a controller;
      second interface means for receiving said image signal transmitted from said first interface means; and
      charging means for charging said power source, said charging means starting to charge said power source upon attachment of said adapter to said image signal generating device, wherein the image signal generating device control means is inhibited from controlling the image signal generation operation of said image signal generating means in response to said attachment.

18. An image processing system according to claim 17, wherein said image signal generating means comprises an image pickup means for photoelectrically converting a subject image.

19. An image processing system according to claim 17, wherein said image signal generating means comprises means for reproducing an image signal stored in a storage medium.

20. An image processing system according to claim 17, wherein said first interface means includes:
   means for detecting an establishment of a connection between said image signal generating device and said adapter.

21. An image processing system according to claim 17, wherein said adapter further comprising:

means for, via a public circuit, transmitting an image signal received from said second interface means.

22. An image processing system according to claim 21, wherein said public circuit comprises a telephone circuit.

23. A processing terminal detachable from a capture terminal for performing an image capture operation under control of an image capture processing section, said processing terminal comprising:

a controller;

an interface for receiving an image signal transmitted from said capture terminal; and a processing circuit for processing the image signal transmitted from said capture terminal;

wherein, responsive to attachment of said capture terminal to said processing terminal, said controller starts controlling said capture terminal instead of said image.

24. A terminal according to claim 23, wherein said processing circuit includes a memory circuit for storing the image signal.

25. A terminal according to claim 23, wherein said processing circuit includes a display processing circuit for processing the image signal for display.

26. A terminal according to claim 23, wherein said processing circuit includes a transmitting processing circuit for converting the image signal into a transmission signal for transmission to an external apparatus through a public circuit.

27. A terminal according to claim 23, wherein the capture terminal includes a detection circuit for detecting the establishment of the attachment between said processing terminal and said capture terminal.

28. A terminal according to claim 23, wherein said processing terminal further includes a detection circuit for detecting establishment of the attachment between said processing terminal and said capture terminal.

29. A terminal according to claim 23, wherein the capture terminal comprises a camera.

30. A terminal according to claim 23, wherein said processing terminal supplies power to said capture terminal in response to the attachment between said processing terminal and said capture terminal.

31. An image processing system comprising:

(A) an image signal generating device including:

image signal generating means for generating an image signal, a power source for supplying electric power to said generating means;

control means for controlling an operation of said image signal generating device; and first interface means for transmitting said image signal to an external unit; and (B) a circuit-connecting adapter which is detachable from said image signal generating device, said adapter including:

a controller;

second interface means for receiving said image signal transmitted from said first interface means; and charging means form charging said power source, said charging means starting to charge said power source upon attachment of said adapter to said image signal generating device, wherein the image signal generating device control means is inhibited from controlling the image signal generation operation of said image signal generating means in response to said attachment.

32. A system according to claim 31, wherein said first interface means includes means for detecting a establishment of a connection between said image signal generating device and said adapter.

33. A system according to claim 31, wherein said adapter further comprises means for, via a public circuit, transmitting an image signal received from said second interface means.

34. A system according to claim 33, wherein said public circuit comprises a telephone circuit.

35. A system according to claim 31, wherein said image signal generating means comprises an image pickup means for photoelectrically converting a subject image.

36. A system according to claim 31, wherein said image signal generating means comprises means for reproducing an image signal stored in a storage medium.

37. A circuit-connecting adaptor which is detachable from an image signal generating device that includes (i) image signal generating means for generating an image signal, (ii) first interface means for transmitting said image signal to an external unit, and (iii) control means for controlling an operation of said image signal generating device, said circuit-connecting adaptor comprising:

a controller;

second interface means for receiving said image signal transmitted from said first interface means;

wherein the image signal generating device control means is inhibited from controlling the operation of said image signal generating device in response to an attachment between said image signal generating device and said circuit-connecting adaptor and the circuit-connecting adaptor controller begins controlling an operation of said image signal generating device.

* * * * *

UNITED STATES PATENT AND TRADEMARK OFFICE
CERTIFICATE OF CORRECTION

PATENT NO. : 5,727,049
DATED : March 10, 1998
INVENTOR(S) : EIICHI SATO

It is certified that error appears in the above-identified patent and that said Letters Patent is hereby corrected as shown below: On the title page: Item At [56] References Cited

FOREIGN PATENT DOCUMENTS

"01277081" should read --1-277081--.

Column 1

Line 25, "to" should be deleted.
    Line 36, "outdoosr" should read --outdoors--.
    Line 67, "electric power supply" should read --supplying electric power--.

Column 2

Line 1, "ing" should be deleted.
    Line 6, "a" (second occurrence) should be deleted.
    Line 7, "an" should be deleted.

UNITED STATES PATENT AND TRADEMARK OFFICE
CERTIFICATE OF CORRECTION

PATENT NO. : 5,727,049

DATED : March 10, 1998

INVENTOR(S) : EIICHI SATO

It is certified that error appears in the above-identified patent and that said Letters Patent is hereby corrected as shown below:

Column 4

Line 17, "the" (first occurrence) should be deleted.
Line 41, "camera" should read --camera 30.--
Line 54, "a" (second occurrence) should read --an--.

Column 5

Line 41, "illustrates" should read --illustrate--.
Line 48, "mode" should read --modes--.

Column 6

Line 27, "where" should be deleted.

Column 7

Line 4, "The, the" should read --The--.

Column 8

Line 4, "be" should be deleted.
Line 13, "as" should be deleted.
Line 64, "changed" should read --may be changed--.

UNITED STATES PATENT AND TRADEMARK OFFICE
CERTIFICATE OF CORRECTION

PATENT NO. : 5,727,049
DATED : March 10, 1998
INVENTOR(S) : EIICHI SATO

It is certified that error appears in the above-identified patent and that said Letters Patent is hereby corrected as shown below:

<u>Column 11</u>

Line 19, "image." should read --image capture processing section.--.

Lines 49 to 50, delete in their entirety.

Signed and Sealed this

Tenth Day of November 1998

*Attest:*

BRUCE LEHMAN

*Attesting Officer*   *Commissioner of Patents and Trademarks*